United States Patent
Greene et al.

(10) Patent No.: US 10,544,860 B2
(45) Date of Patent: Jan. 28, 2020

(54) PROPULSION SYSTEM FOR A CONSTRUCTION MACHINE

(71) Applicant: Caterpillar Paving Products Inc., Brooklyn Park, MN (US)

(72) Inventors: Nicholas Aaron Greene, Elk River, MN (US); Derek Kenneth Huhn, Monticello, MN (US); Benjamin Thomas Schafer, Elk River, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 239 days.

(21) Appl. No.: 15/825,433

(22) Filed: Nov. 29, 2017

(65) Prior Publication Data

US 2019/0162296 A1    May 30, 2019

(51) Int. Cl.
| | |
|---|---|
| *F16H 59/72* | (2006.01) |
| *B60H 1/32* | (2006.01) |
| *F01P 7/04* | (2006.01) |
| *E01C 19/28* | (2006.01) |
| *F16L 33/10* | (2006.01) |
| *F16K 31/40* | (2006.01) |

(52) U.S. Cl.
CPC .............. *F16H 59/72* (2013.01); *B60H 1/32* (2013.01); *E01C 19/281* (2013.01); *F01P 7/042* (2013.01); *F01P 7/044* (2013.01); *F15B 2211/611* (2013.01); *F16H 2059/725* (2013.01); *F16K 31/40* (2013.01); *F16L 33/10* (2013.01)

(58) Field of Classification Search
CPC ..... F16H 59/72; F16H 2059/725; B60H 1/32; E01C 19/281; F01P 7/042; F01P 7/044; F15B 2211/611; F16D 33/10; F16K 31/40

USPC ........................................................ 180/306
See application file for complete search history.

(56) References Cited

U.S. PATENT DOCUMENTS

| | | | |
|---|---|---|---|
| 4,878,544 A * | 11/1989 | Barnhart | E01C 19/281 172/40 |
| 6,408,995 B2 | 6/2002 | Widemann | |
| 6,966,180 B2 | 11/2005 | Deneir et al. | |
| 8,347,620 B2 | 1/2013 | Yu et al. | |
| 8,468,818 B2 * | 6/2013 | Hyodo | F16H 61/4078 60/456 |
| 8,833,069 B2 | 9/2014 | Derrick et al. | |
| 10,280,949 B2 * | 5/2019 | Kondo | F16H 39/04 |

FOREIGN PATENT DOCUMENTS

CN           101082200           12/2007

* cited by examiner

*Primary Examiner* — John D Walters

(57) ABSTRACT

A construction machine having a frame and at least one compaction member is provided. The machine also includes a propulsion system having a hydraulic motor adapted to rotate the compaction member. The propulsion system also includes a hydraulic pump fluidly coupled to the hydraulic motor via a high pressure line and a low pressure line. The high pressure line allows flow of a fluid at high pressure from the hydraulic pump to the hydraulic motor. The low pressure line allows flow of the fluid at low pressure from the hydraulic motor to the hydraulic pump. The propulsion system further includes a hydraulic valve fluidly coupled to the low pressure line and a casing of the hydraulic motor. The hydraulic valve selectively allows flow of a portion of the fluid at low pressure from the low pressure line to the casing for cooling of the hydraulic motor.

20 Claims, 4 Drawing Sheets

PROPULSION SYSTEM FOR A CONSTRUCTION MACHINE

TECHNICAL FIELD

The present disclosure relates to a propulsion system for a construction machine. More particularly, the present disclosure relates to a method of cooling the propulsion system of the construction machine.

BACKGROUND

A machine, such as a pneumatic compactor, includes a hydraulic propulsion system for providing motive power to one or more compaction members of the machine. The propulsion system may include hydraulic motors to drive the compaction members. The hydraulic motors and, thus, the compaction members and the machine may generally be operated with a specified speed range in order to limit overheating of the hydraulic motors. However, in some compaction applications, such as a chip sealing process, the machine may be required to be operated at a relatively higher speed in order to achieve desired process quality. Hence, there is a need for an improved method of cooling for such hydraulic propulsion systems.

U.S. Pat. No. 6,408,995 describes a hydraulic motor with a braking device. The braking device is acted upon by means of a control fluid via a brake release line. The brake release line is used to allow a continuous flushing flow of control fluid through the hydraulic motor at the same time as the release of the brake. The braking device is connected to the casing of the hydraulic motor. An outlet opening of the hydraulic motor leads via a leakage-oil line to the tank for the control fluid. In a hydraulic travel drive with a closed hydraulic circuit, the brake release line can be connected to the shut-off device for the servo adjustment system of the variable-displacement pump, and the leakage-oil line of the hydraulic motor can lead to the tank for the entire hydraulic fluid in the system. Since the control fluid coming from the tank for the hydraulic fluid is always cooler than the hydraulic fluid used to drive the hydraulic motor and circulating in the closed circuit, a cooling effect on the hydraulic motor is obtained.

SUMMARY OF THE DISCLOSURE

In an aspect of the present disclosure, a construction machine is provided. The machine includes a frame and at least one compaction member rotatably mounted to the frame. The machine also includes a propulsion system mounted on the frame. The propulsion system includes at least one hydraulic motor adapted to rotate the at least one compaction member. The propulsion system also includes at least one hydraulic pump fluidly coupled to the at least one hydraulic motor via a high pressure line and a low pressure line. The high pressure line is adapted to allow flow of a fluid at high pressure from the at least one hydraulic pump to the at least one hydraulic motor. The low pressure line is adapted to allow flow of the fluid at low pressure from the at least one hydraulic motor to the at least one hydraulic pump. The propulsion system further includes at least one hydraulic valve fluidly coupled to the low pressure line and a casing of the at least one hydraulic motor. The at least one hydraulic valve is adapted to selectively allow flow of at least a portion of the fluid at low pressure from the low pressure line to the casing for cooling of the at least one hydraulic motor.

In another aspect of the present disclosure, a propulsion system for a construction machine is provided. The construction machine has at least a first compaction member, a second compaction member, a third compaction member, and a fourth compaction member associated therewith. The propulsion system includes a first hydraulic motor adapted to rotate the first compaction member. The propulsion system includes a second hydraulic motor adapted to rotate the second compaction member. The propulsion system includes a third hydraulic motor adapted to rotate the third compaction member. The propulsion system includes a fourth hydraulic motor adapted to rotate the fourth compaction member. The propulsion system includes a first hydraulic pump fluidly coupled to each of the first hydraulic motor and the second hydraulic motor via a first high pressure line and a first low pressure line. The first high pressure line is adapted to allow flow of a fluid at high pressure from the first hydraulic pump to each of the first hydraulic motor and the second hydraulic motor. The first low pressure line is adapted to allow flow of the fluid at low pressure from each of the first hydraulic motor and the second hydraulic motor to the first hydraulic pump. The propulsion system includes a second hydraulic pump fluidly coupled to each of the third hydraulic motor and the fourth hydraulic motor via a second high pressure line and a second low pressure line. The second high pressure line is adapted to allow flow of a fluid at high pressure from the second hydraulic pump to each of the third hydraulic motor and the fourth hydraulic motor. The second low pressure line is adapted to allow flow of the fluid at low pressure from each of the third hydraulic motor and the fourth hydraulic motor to the second hydraulic pump. The propulsion system also includes a first hydraulic valve fluidly coupled to the first low pressure line and a casing of each of the first hydraulic motor and the second hydraulic motor. The propulsion system further includes a second hydraulic valve fluidly coupled to the second low pressure line and a casing of each of the third hydraulic motor and the fourth hydraulic motor. Each of the first hydraulic valve and the second hydraulic valve is adapted to selectively allow flow of at least a portion of the fluid at low pressure from each of the first low pressure line and the second low pressure line to the respective casings for cooling of each of the first hydraulic motor, the second hydraulic motor, the third hydraulic motor, and the fourth hydraulic motor respectively.

In yet another aspect of the present disclosure, a method for cooling a propulsion system associated with a construction machine is provided. The method includes providing flow of a fluid at high pressure from at least one hydraulic pump to at least one hydraulic motor. The method includes providing flow of the fluid at low pressure from the at least one hydraulic motor to the at least one hydraulic pump. The method also includes selectively bleeding at least a portion of the fluid at low pressure to a casing of the at least one hydraulic motor. The method further includes cooling the at least one hydraulic motor using flow of at least the portion of the fluid at low pressure through the casing of the at least one hydraulic motor.

Other features and aspects of this disclosure will be apparent from the following description and the accompanying drawings.

DETAILED DESCRIPTION

Figure 1:
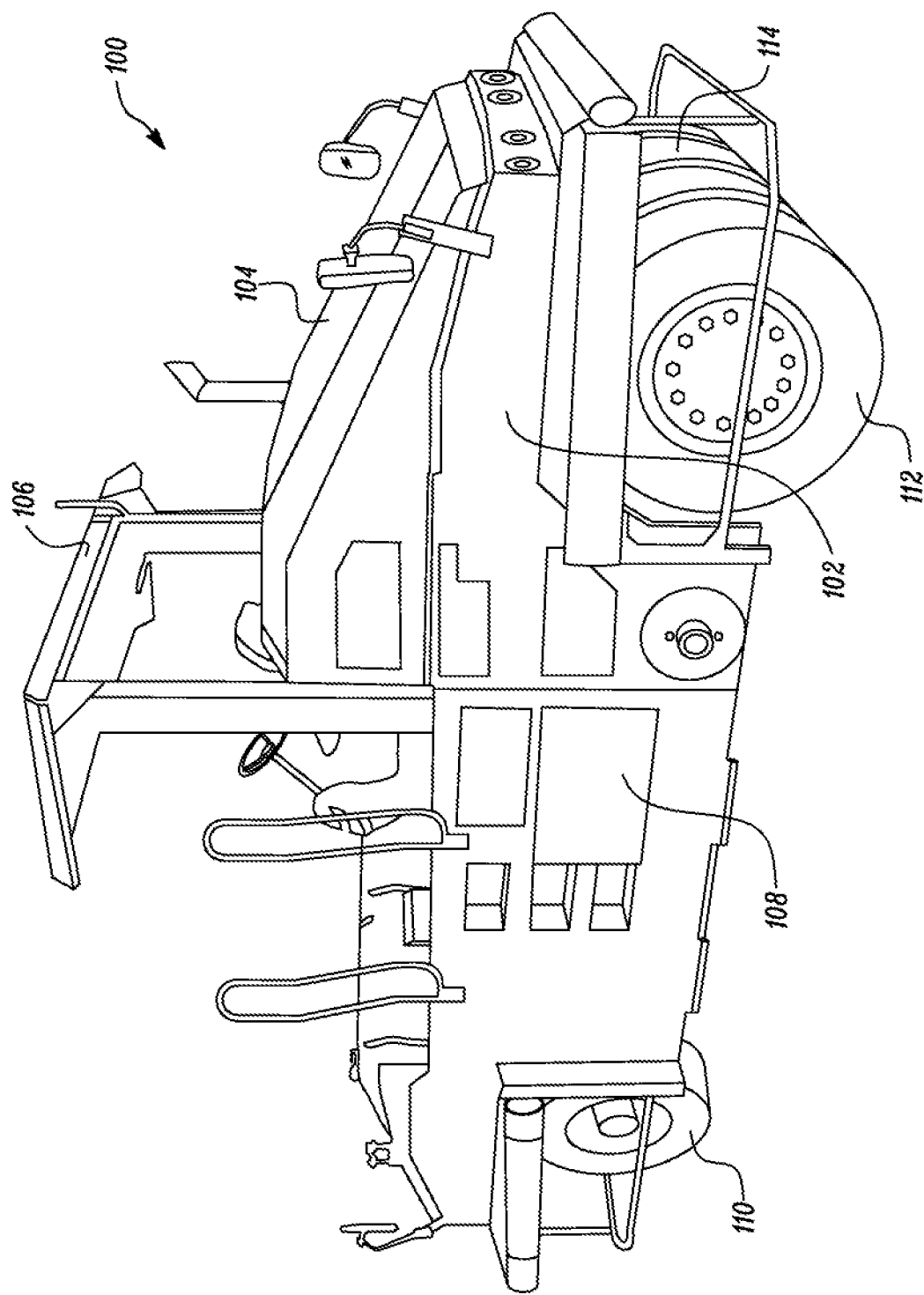
FIG. 1 is a perspective view of an exemplary machine, according to one embodiment of the present disclosure.

Wherever possible, the same reference numbers will be used throughout the drawings to refer to the same or the like parts. Referring to FIG. 1, an exemplary construction machine 100 is illustrated. More specifically, the machine 100 is a compaction machine. The machine 100 is adapted to perform tasks, such as compaction or levelling of a ground surface, an asphalt surface, and so on. The machine 100 may be associated with an industry such as construction, road building, and so on.

The machine 100 includes a frame 102 adapted to support one or more components of the machine 100 thereon. The machine 100 includes an enclosure 104 provided on the frame 102 for enclosing a power source (not shown) mounted on the frame 102. The power source may be any power source known in the art, such as an internal combustion engine, batteries, motor, and so on, or a combination thereof. The power source may be adapted to provide power to the machine 100 for mobility and operational requirements.

The machine 100 includes an operator cabin 106 mounted on the frame 102. The operator cabin 106 houses various controls (not shown) of the machine 100 including, for example, a steering, levers, pedals, a control console, buttons, audio visual devices, and so on. The controls may be configured to control the machine 100 on ground. The machine 100 also includes a ballast compartment 108 provided within the frame 102 for receiving a ballast system (not shown). The ballast system is adapted to provide a desired weight to the machine 100 during the compaction process, based on application requirements.

The machine 100 also includes one or more compaction members, such as a first compaction member 110, a second compaction member (not shown), a third compaction member 112, and a fourth compaction member 114. Each of the first compaction member 110, the second compaction member, the third compaction member 112, and the fourth compaction member 114 is rotatably mounted to the frame 102. In the illustrated embodiment, the machine 100 includes four compaction members. In other embodiments, the machine 100 may include single or multiple compaction members, based on application requirements. Also, in the illustrated embodiment, each of the first compaction member 110, the second compaction member, the third compaction member 112, and the fourth compaction member 114 is a pneumatic roller.

In other embodiments, one or more of the first compaction member 110, the second compaction member, the third compaction member 112, and the fourth compaction member 114 may be a pneumatic drum, a metallic drum, a metallic roller, and so on. Each of the first compaction member 110, the second compaction member, the third compaction member 112, and the fourth compaction member 114 is adapted to support and provide mobility to the machine 100 on the ground. Each of the first compaction member 110, the second compaction member, the third compaction member 112, and the fourth compaction member 114 is also adapted to perform compaction of the ground surface, the asphalt surface, and so on, based on application requirements.

Figure 2:
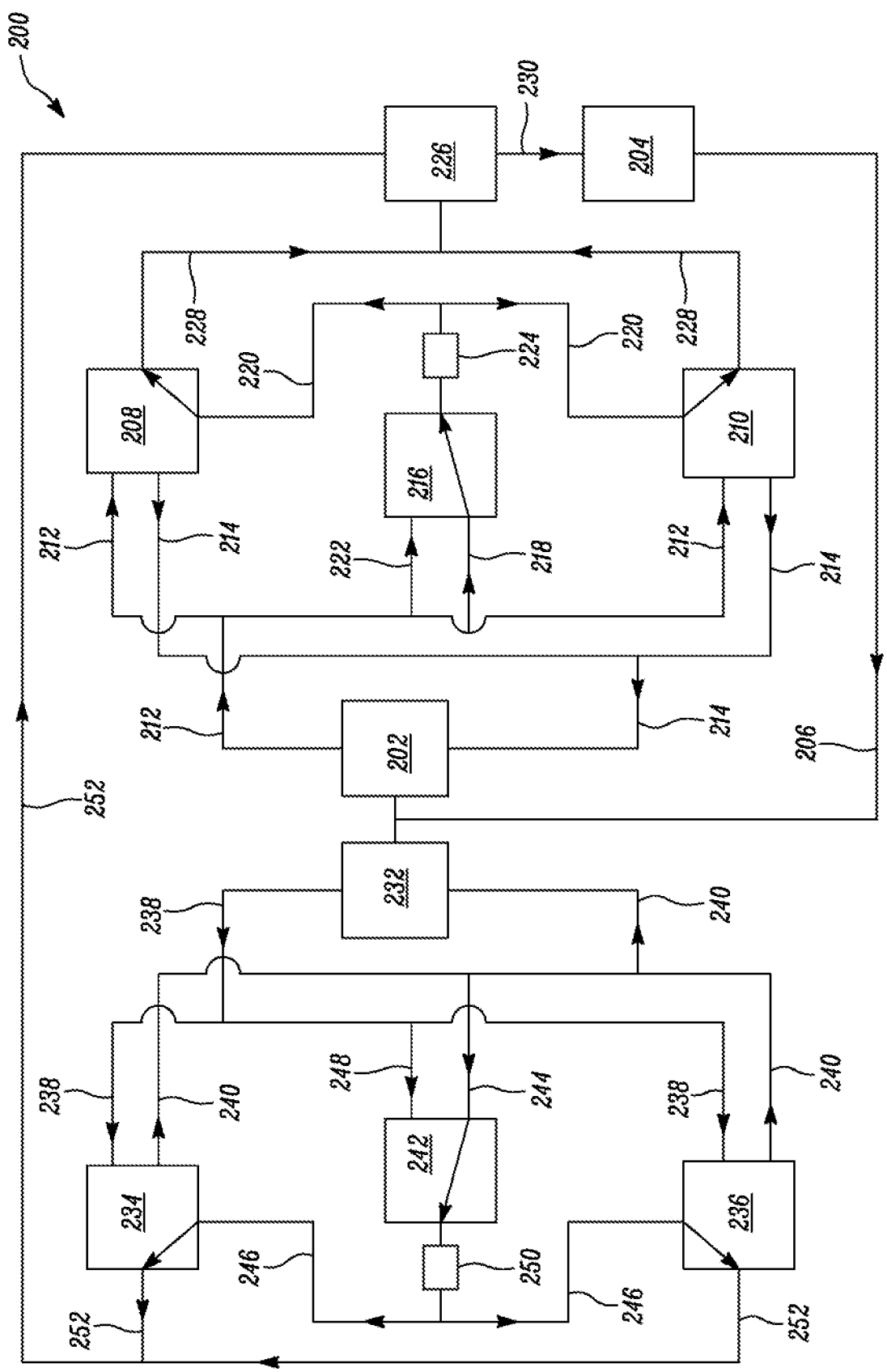
FIG. 2 is a schematic representation of a propulsion system for the machine of FIG. 1, according to one embodiment of the present disclosure.

Referring to FIG. 2, the machine 100 further includes a propulsion system 200 mounted on the frame 102. The propulsion system 200 is adapted to provide motive power to each of the first compaction member 110, the second compaction member, the third compaction member 112, and the fourth compaction member 114. The propulsion system 200 includes a first hydraulic pump 202. The first hydraulic pump 202 will be hereinafter interchangeably referred to as the "first pump 202". The first pump 202 is adapted to receive a flow of a fluid from a hydraulic tank 204 associated with the propulsion system 200 and/or the machine 100 via a supply line 206.

The hydraulic tank 204 may be any reservoir or storage tank adapted to store the fluid therein. The fluid may be any hydraulic fluid known in the art, such as hydraulic oil. The first pump 202 is also adapted to pressurize the received fluid to a higher pressure and deliver the high pressure fluid to one or more downstream components fluidly coupled thereto. The first pump 202 may be any pump known in the art adapted for hydraulic applications, such as a positive displacement pump. The first pump 202 may be operably coupled to the power source of the machine 100 in order to receive mechanical power for operational purpose.

The propulsion system 200 also includes a first hydraulic motor 208 and a second hydraulic motor 210. The first hydraulic motor 208 and the second hydraulic motor 210 will be hereinafter interchangeably referred to as the "first motor 208" and the "second motor 210" respectively. Each of the first and second motors 208, 210 is fluidly coupled to the first pump 202. Each of the first and second motors 208, 210 is further fluidly coupled to each of the first and second compaction members 110 respectively. In the illustrated embodiment, the propulsion system 200 includes two hydraulic motors separately and individually connected to the first and second compaction members 110 respectively. In other embodiments, the propulsion system 200 may include a single hydraulic motor coupled to each of the first and second compaction members 110, based on application requirements.

Each of the first and second motors 208, 210 is fluidly coupled to the first pump 202 via a first high pressure line 212. Accordingly, each of the first and second motors 208, 210 is adapted to receive the high pressure fluid from the first pump 202 in order to rotate each of the first and second compaction members 110 respectively. Each of the first and second motors 208, 210 is also fluidly coupled to the first pump 202 via a first low pressure line 214. The first low pressure line 214 is adapted to provide a flow of the fluid at low pressure from each of the first and second motors 208, 210 to the first pump 202. In some embodiments (not shown), the first low pressure line 214 may be fluidly coupled to the hydraulic tank 204. In such a situation, the low pressure fluid from each of the first and second motors 208, 210 may be delivered to the hydraulic tank 204 and further to the first pump 202 via the supply line 206.

The propulsion system 200 also includes a first hydraulic valve 216. The first hydraulic valve 216 will be hereinafter interchangeably referred to as the "first valve 216". In the illustrated embodiment, the first valve 216 is a pilot operated shuttle valve. In other embodiments, the first valve 216 may be any valve known in the art for hydraulic applications, such as an electrically operated hydraulic valve. The first valve 216 is fluidly coupled to the first low pressure line 214 downstream of each of the first and second motors 208, 210 via a first bleed line 218. The first valve 216 is further fluidly coupled to a casing (not shown) of each of the first and second motors 208, 210 via a first cooling inlet line 220. Accordingly, the first valve 216 is adapted to selectively allow flow of at least a portion of the low pressure fluid from the first low pressure line 214 to the casing of each of the first and second motors 208, 210.

More specifically, the first valve 216 is also coupled to the first high pressure line 212 upstream of each of the first and second motors 208, 210 via a first pilot line 222. Accordingly, based on the operation of the first pump 202, the high pressure fluid provides a pilot pressure through the first pilot line 222 for operation of the first valve 216. Accordingly, based on the pilot pressure, the first valve 216 may be operated and may selectively allow flow of the portion of the low pressure fluid from the first low pressure line 214 to the casing of each of the first and second motors 208, 210. The low pressure fluid flowing through the casing of each of the first and second motors 208, 210 provides cooling of each of the first and second motors 208, 210.

Additionally, or optionally, in some embodiments, the propulsion system 200 may include a first orifice 224 provided in association with the first valve 216. In the illustrated embodiment, the first orifice 224 is provided downstream of the first valve 216 in the first cooling inlet line 220. In other embodiments, the first orifice 224 may be provided upstream of the first valve 216 in the first bleed line 218. The first orifice 224 is adapted to limit flow of the portion of the low pressure fluid from the first valve 216 to the casing of each of the first and second motors 208, 210. It should be noted that, in some embodiments, the propulsion system 200 may include multiple hydraulic valves, such that separate hydraulic valves may be fluidly coupled to the casing of each of the first and second motors 208, 210, based on application requirements.

The propulsion system 200 also includes a second hydraulic pump 232. The second hydraulic pump 232 will be hereinafter interchangeably referred to as the "second pump 232". The second pump 232 is adapted to receive a flow of a fluid from the hydraulic tank 204 associated with the propulsion system 200 and/or the machine 100 via the supply line 206. The second pump 232 is also adapted to pressurize the received fluid to a higher pressure and deliver the high pressure fluid to one or more downstream components fluidly coupled thereto. The second pump 232 may be any pump known in the art adapted for hydraulic applications, such as a positive displacement pump. The second pump 232 may be operably coupled to the power source of the machine 100 in order to receive mechanical power for operational purpose.

The propulsion system 200 also includes a third hydraulic motor 234 and a fourth hydraulic motor 236. The third hydraulic motor 234 and the fourth hydraulic motor 236 will be hereinafter interchangeably referred to as the "third motor 234" and the "fourth motor 236" respectively. Each of the third and fourth motors 234, 236 is fluidly coupled to the second pump 232. Each of the third and fourth motors 234, 236 is further fluidly coupled to each of the third and fourth compaction members 112, 114 respectively. In the illustrated embodiment, the propulsion system 200 includes two hydraulic motors separately and individually connected to the third and fourth compaction members 112, 114 respectively. In other embodiments, the propulsion system 200 may include a single hydraulic motor coupled to each of the third and fourth compaction members 112, 114, based on application requirements.

Each of the third and fourth motors 234, 236 is fluidly coupled to the second pump 232 via a second high pressure line 238. Accordingly, each of the third and fourth motors 234, 236 is adapted to receive the high pressure fluid from the second pump 232 in order to rotate each of the third and fourth compaction members 112, 114 respectively. Each of the third and fourth motors 234, 236 is also fluidly coupled to the second pump 232 via a second low pressure line 240. The second low pressure line 240 is adapted to provide a flow of the fluid at low pressure from each of the third and fourth motors 234, 236 to the second pump 232. In some embodiments (not shown), the second low pressure line 240 may be fluidly coupled to the hydraulic tank 204. In such a situation, the low pressure fluid from each of the third and fourth motors 234, 236 may be delivered to the hydraulic tank 204 and further to the second pump 232 via the supply line 206.

The propulsion system 200 also includes a second hydraulic valve 242. The second hydraulic valve 242 will be hereinafter interchangeably referred to as the "second valve 242". In the illustrated embodiment, the second valve 242 is a pilot operated shuttle valve. In other embodiments, the second valve 242 may be any valve known in the art for hydraulic applications, such as an electrically operated hydraulic valve. The second valve 242 is fluidly coupled to the second low pressure line 240 downstream of each of the third and fourth motors 234, 236 via a second bleed line 244. The second valve 242 is further fluidly coupled to a casing (not shown) of each of the third and fourth motors 234, 236 via a second cooling inlet line 246. Accordingly, the second valve 242 is adapted to selectively allow flow of at least a portion of the low pressure fluid from the second low pressure line 240 to the casing of each of the third and fourth motors 234, 236.

More specifically, the second valve 242 is also coupled to the second high pressure line 238 upstream of each of the third and fourth motors 234, 236 via a second pilot line 248. Accordingly, based on the operation of the second pump 232, the high pressure fluid provides a pilot pressure through the second pilot line 248 for operation of the second valve 242. Accordingly, based on the pilot pressure, the second valve 242 may be operated and may selectively allow flow of the portion of the low pressure fluid from the second low pressure line 240 to the casing of each of the third and fourth motors 234, 236. The low pressure fluid flowing through the casing of each of the third and fourth motors 234, 236 provides cooling of each of the third and fourth motors 234, 236.

Additionally, or optionally, in some embodiments, the propulsion system 200 may include a second orifice 250 provided in association with the second valve 242. In the illustrated embodiment, the second orifice 250 is provided downstream of the second valve 242 in the second cooling inlet line 246. In other embodiments, the second orifice 250 may be provided upstream of the second valve 242 in the second bleed line 244. The second orifice 250 is adapted to limit flow of the portion of the low pressure fluid from the second valve 242 to the casing of each of the third and fourth motors 234, 236. It should be noted that, in some embodiments, the propulsion system 200 may include multiple hydraulic valves, such that separate hydraulic valves may be fluidly coupled to the casing of each of the third and fourth motors 234, 236, based on application requirements.

The propulsion system 200 further includes a hydraulic cooler 226. The hydraulic cooler 226 may be any heat exchanger known in the art adapted to transfer heat between a working fluid, and a coolant or air. The hydraulic cooler 226 is fluidly coupled to the casing of each of the first and second motors 208, 210 via a first cooling outlet line 228. The hydraulic cooler 226 is also fluidly coupled to the casing of each of the third and fourth motors 234, 236 via a second cooling outlet line 252. The hydraulic cooler 226 is adapted to receive flow of the portion of the low pressure fluid from the casing of each of the first, second, third, and fourth motors 208, 210, 234, 236. Accordingly, the hydraulic cooler 226 provides cooling of the portion of the low pressure fluid downstream of each of the first, second, third, and fourth motors 208, 210, 234, 236. It should be noted that the portion of the low pressure fluid may be mixed with other fluid flow associated with other hydraulic systems/components associated with the machine 100 upstream of and/or within the hydraulic cooler 226.

Further, the hydraulic cooler 226 is fluidly coupled to each of the first and second pumps 202, 232 via the hydraulic tank 204. Accordingly, the portion of the low pressure fluid cooled by the hydraulic cooler 226 may flow into the hydraulic tank 204 via a tank inlet line 230 and may mix with the fluid already present in the hydraulic tank 204. As such, an overall temperature of the fluid present within the hydraulic tank 204 may be lowered. The cooled mixture of the cooled low pressure fluid and the fluid already present within the hydraulic tank 204 may then be supplied to each of the first and second pumps 202, 232 via the supply line 206 for being further delivered to each of the first, second, third, and fourth motors 208, 210, 234, 236 and the first and second valves 216, 242.

It should be noted that the propulsion system 200, including the first and second high pressure lines 212, 238, the first and second low pressure lines 214, 240, the first and second bleed lines 218, 244, the first and second pilot lines 222, 248, is described considering a forward movement of each of the first, second, third, and fourth motors 208, 210, 234, 236, each of the first, second, third, and fourth compaction members 110, 112, 114, and, thus, the machine 100.

During a reverse movement of the machine 100, each of the first and second high pressure lines 212, 238 may have a reversal of function with respect to each of the first and second low pressure lines 214, 240 respectively. More specifically, the first and second high pressure lines 212, 238 may provide flow of the low pressure fluid from the first, second, third, and fourth motors 208, 210, 234, 236 to the first and second pumps 202, 232 respectively. Also, the first and second low pressure lines 214, 240 may provide flow of the high pressure fluid from the first and second pumps 202, 232 to the first, second, third, and fourth motors 208, 210, 234, 236 respectively.

Further, each of the first and second bleed lines 218, 244 may have a reversal of function with respect to each of the first and second pilot lines 222, 248 respectively. More specifically, the first and second bleed lines 218, 244 may provide the pilot pressure to the first and second valves 216, 242 respectively. Also, the portion of the low pressure fluid may be provided to the casing of the first, second, third, and fourth motors 208, 210, 234, 236 via the first and second pilot lines 222, 248 respectively.

Figure 3:
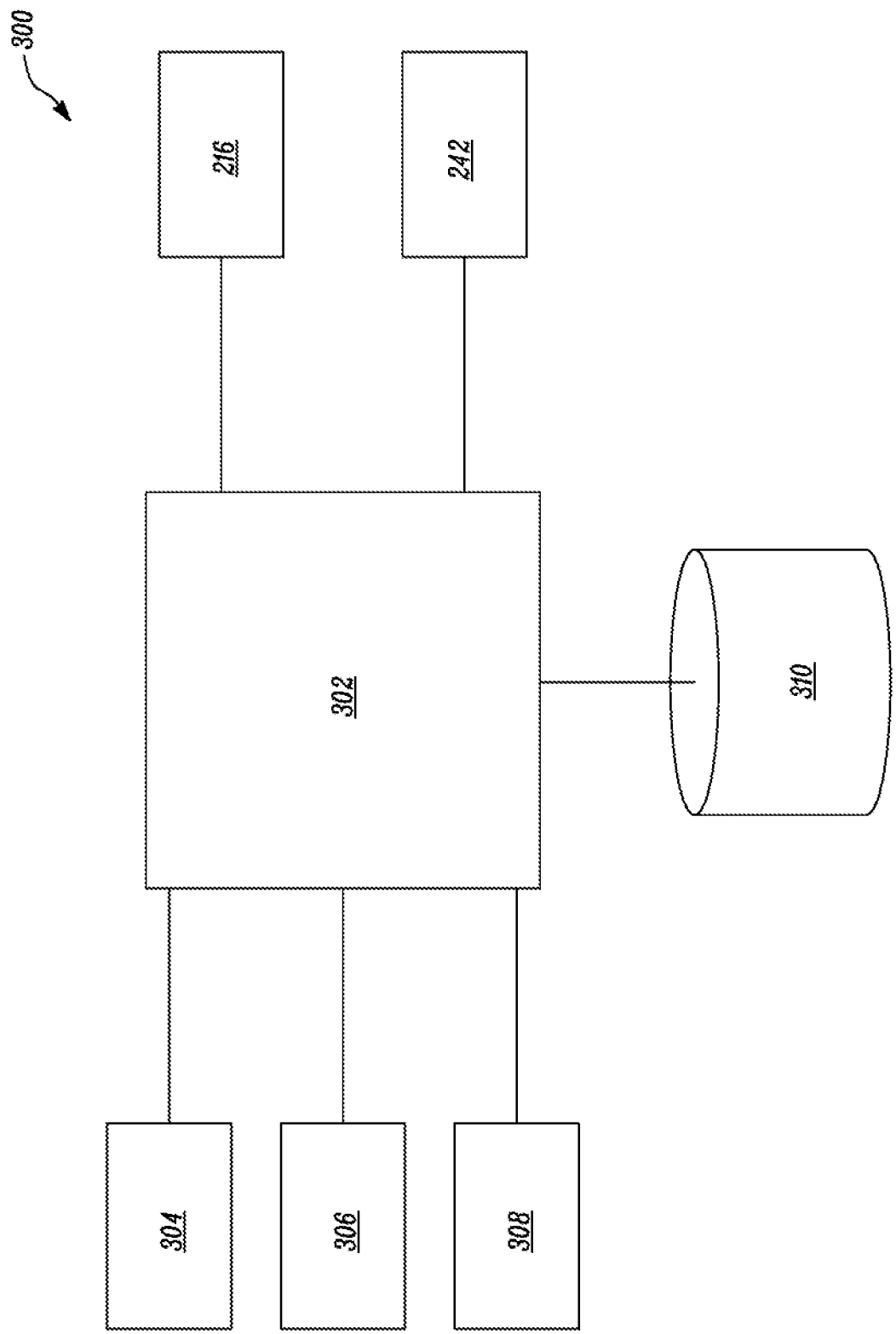
FIG. 3 is a schematic representation of a control system for the propulsion system of FIG. 2, according to one embodiment of the present disclosure.

Referring to FIG. 3, the propulsion system 200 also includes a control system 300. The control system 300 includes a controller 302. The controller 302 may be any control unit known in the art configured to perform various functions of the propulsion system 200. In one embodiment, the controller 302 may be a dedicated control unit configured to perform functions related to the propulsion system 200. In another embodiment, the controller 302 may be a Machine Control Unit (MCU) associated with the machine 100, an Engine Control Unit (ECU) associated with the power source of the machine 100, and so on configured to perform functions related to the propulsion system 200.

The controller 302 is communicably coupled to each of the first and second valves 216, 242 and at least one operational parameter sensor associated with at least one of the machine 100, the first motor 208, the second motor 210, the third motor 234, and the fourth motor 236. In one embodiment, the operational parameter sensor may be a temperature sensor 304 associated with each of the first, second, third, and fourth motors 208, 210, 234, 236. The temperature sensor 304 may be configured to generate a signal indicative of an operational parameter, such as a temperature of each of the first, second, third, and fourth motors 208, 210, 234, 236. In another embodiment, the operational parameter sensor may be a speed sensor 306 associated with each of the first, second, third, and fourth motors 208, 210, 234, 236. The speed sensor 306 may be configured to generate a signal indicative of an operational parameter, such as a rotational speed of each of the first, second, third, and fourth motors 208, 210, 234, 236.

In yet another embodiment, the operational parameter sensor may be a speed sensor 308 associated with the machine 100. The speed sensor 308 may be configured to generate a signal indicative of an operational parameter, such as a ground speed of the machine 100. It should be noted that, in other embodiments, the operational parameters of the machine 100 and/or each of the first, second, third, and fourth motors 208, 210, 234, 236 may vary, based on application requirements, and/or may include one or more operational parameters associated with other components of the machine 100 and/or the propulsion system 200 not described herein, based on application requirements.

Accordingly, the controller 302 is configured to receive the signal indicative of the operational parameter associated with the machine 100 and/or one or more of the first, second, third, and fourth motors 208, 210, 234, 236. The controller 302 is also configured to determine exceeding of the operational parameter beyond a respective threshold. Based on the determination, the controller 302 is further configured to control one or more of the first and second valves 216, 242 to selectively allow flow of the portion of the low pressure fluid from one or more of the first and second low pressure lines 214, 240 to the casing of one or more of the first, second, third, and fourth motors 208, 210, 234, 236 respectively.

The controller 302 may control each of the first and second valves 216, 242 based on any method or process known in the art. For example, in one embodiment, the controller 302 may control each of the first and second valves 216, 242 based on a dataset stored in a database 310 communicably coupled to the controller 302. The dataset may include varying values of one or more operational parameters related to each of the first and second valves 216, 242 for varying values of the one or more operational parameters related to the machine 100 and/or each of the first, second, third, and fourth motors 208, 210, 234, 236.

In another embodiment, the controller 302 may control each of the first and second valves 216, 242 based on a mathematical expression stored in the database 310. In such a situation, the controller 302 may derive varying values of one or more operational parameters related to each of the first and second valves 216, 242 for varying values of the one or more operational parameters related to the machine 100 and/or each of the first, second, third, and fourth motors 208, 210, 234, 236 based on the mathematical expression. Also, it should be noted, that in a situation when the propulsion system 200 may include multiple hydraulic valves, the controller 302 may control one or more of the multiple hydraulic valves individually, sequentially, or simultaneously based on the one or more operational parameters related to the machine 100 and/or one or more of the first, second, third, and fourth motors 208, 210, 234, 236, based on application requirements.

INDUSTRIAL APPLICABILITY

Figure 4:
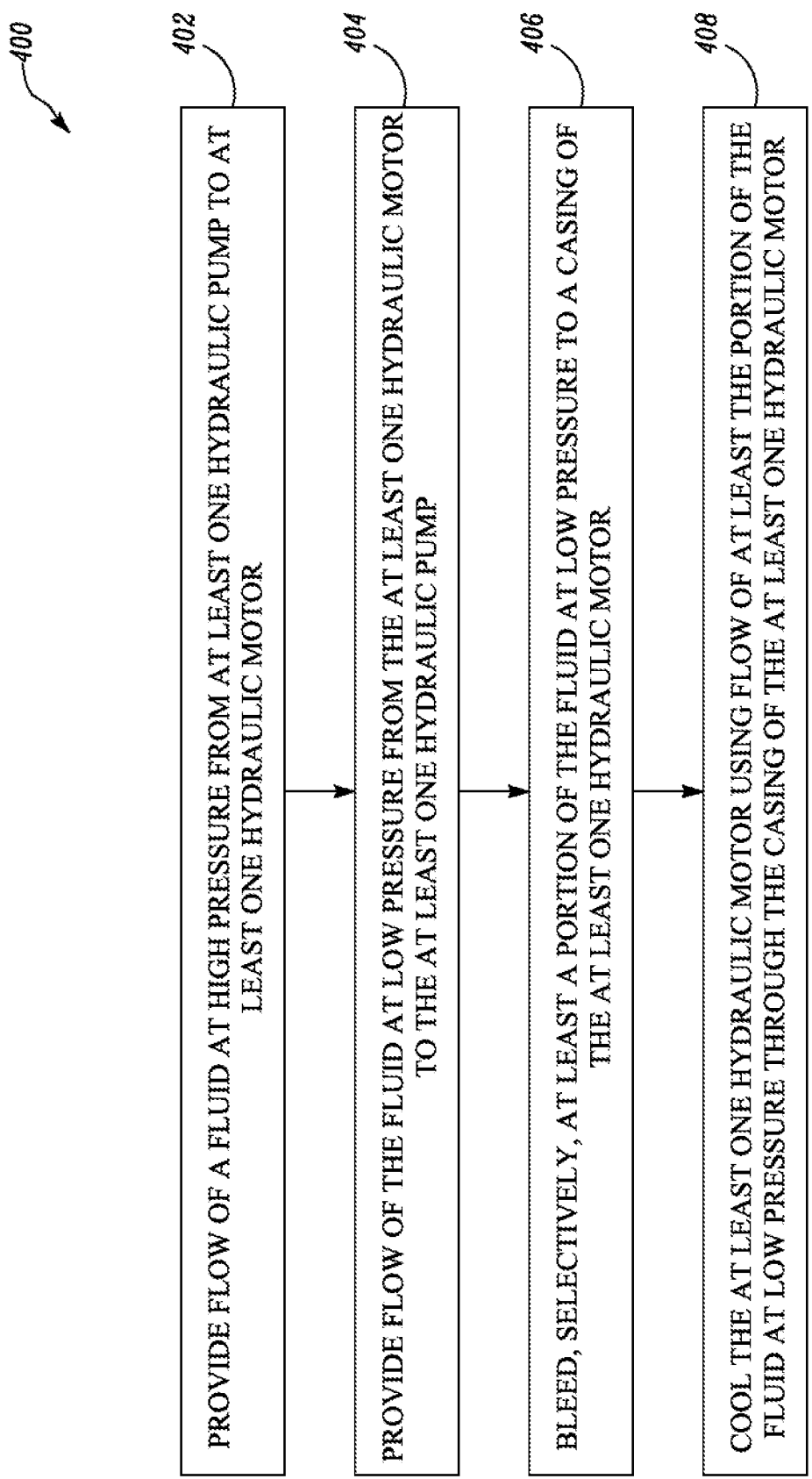
FIG. 4 is a flowchart illustrating a method of cooling the propulsion system of FIG. 2, according to an embodiment of the present disclosure.

The present disclosure relates to a method 400 for cooling the propulsion system 200 associated with the machine 100. Referring to FIG. 4, a flowchart of the method 400 is illustrated. At step 402, flow of the high pressure fluid is provided from the first and second pumps 202, 232 to the first, second, third, and fourth motors 208, 210, 234, 236 respectively. More specifically, flow of the high pressure fluid is provided via the first and second high pressure lines 212, 238. At step 404, flow of the low pressure fluid is provided from the first, second, third, and fourth motors 208, 210, 234, 236 to the first and second pumps 202, 232 respectively. More specifically, flow of the low pressure fluid is provided via the first and second low pressure lines 214, 240.

At step 406, the portion of the low pressure fluid is selectively provided to the casing of each of the first, second, third, and fourth motors 208, 210, 234, 236. More specifically, the portion of the low pressure fluid is bled via the first and second bleed lines 218, 244 from the first and second low pressure lines 214, 240 by selectively operating each of the first and second valves 216, 242 respectively. Each of the first and second valves 216, 242 is pilot operated using the high pressure fluid via the first and second pilot lines 222, 248 respectively. Also, each of the first and second valves 216, 242 is operated through the controller 302 based on exceeding of the one or more operational parameters associated with the one or more of the machine 100 and the first, second, third, and fourth motors 208, 210, 234, 236 beyond the respective threshold.

Further, the portion of the low pressure fluid is provided from each of the first and second valves 216, 242 to the casing of each of the first, second, third, and fourth motors 208, 210, 234, 236 via the first and second cooling inlet lines 220, 246 respectively. Accordingly, at step 408, each of the first, second, third, and fourth motors 208, 210, 234, 236 is cooled using flow of the portion of the low pressure fluid through the casing of each of the first, second, third, and fourth motors 208, 210, 234, 236 respectively. Additionally, or optionally, the first and second orifices 224, 250 may be used in association with each of the first and second valves 216, 242, the first and second bleed lines 218, 244, and/or the first and second cooling inlet lines 220, 246 in order to limit flow of the portion of the low pressure fluid to the casing of each of the first, second, third, and fourth motors 208, 210, 234, 236 respectively.

Further, the portion of the low pressure fluid from the casing of each of the first, second, third, and fourth motors 208, 210, 234, 236 is provided to the hydraulic cooler 226 via the first and second cooling outlet lines 228, 252 respectively. The hydraulic cooler 226 provides to reduce the temperature and cool the portion of the low pressure fluid exiting the casing of each of the first, second, third, and fourth motors 208, 210, 234, 236. The cooled portion of the low pressure fluid is further transferred to the hydraulic tank 204 via the tank inlet line 230 and, then, supplied to each of the first and second pumps 202, 232 via the supply line 206. Accordingly, the overall temperature of the propulsion system 200, including the first and second pumps 202, 232 and each of the first, second, third, and fourth motors 208, 210, 234, 236 may be lowered.

The propulsion system 200 and the control system 300 provide a simple, effective, and cost efficient method for cooling each of the first, second, third, and fourth motors 208, 210, 234, 236 associated with the machine 100. As such, the machine 100 may be operated at higher ground speeds, based on application requirements, while limiting overheating of each of the first, second, third, and fourth motors 208, 210, 234, 236 and, in turn, reducing premature failure, improving component life, reducing service interval and cost, and so on. The propulsion system 200 may include components commonly employed in hydraulic systems and/or already present on the machine 100, such as the first and second valves 216, 242, the first and second orifices 224, 250, the hydraulic cooler 226, the controller 302, the temperature sensor 304, the speed sensor 306, the speed sensor 308, and so on, in turn, reducing an overall system cost and complexity. Also, the propulsion system 200 and the control system 300 may be retrofitted on any machine with little or no modification to the existing system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A construction machine comprising:
   a frame;
   at least one compaction member rotatably mounted to the frame; and
   a propulsion system mounted on the frame, the propulsion system including:
     at least one hydraulic motor adapted to rotate the at least one compaction member;
     at least one hydraulic pump fluidly coupled to the at least one hydraulic motor via a high pressure line and a low pressure line, the high pressure line adapted to allow flow of a fluid at high pressure from the at least one hydraulic pump to the at least one hydraulic motor, the low pressure line adapted to allow flow of the fluid at low pressure from the at least one hydraulic motor to the at least one hydraulic pump; and
     at least one hydraulic valve fluidly coupled to the low pressure line and a casing of the at least one hydraulic motor, the at least one hydraulic valve adapted to selectively allow flow of at least a portion of the fluid at low pressure from the low pressure line to the casing for cooling of the at least one hydraulic motor.

2. The construction machine of claim 1, wherein the at least one hydraulic valve is further fluidly coupled to the high pressure line, the high pressure line adapted to provide a pilot pressure to the at least one hydraulic valve.

3. The construction machine of claim 1 further includes a hydraulic cooler fluidly coupled to the casing of the at least one hydraulic motor, the hydraulic cooler adapted to receive flow of at least the portion of the fluid from the casing for cooling of at least the portion of the fluid.

4. The construction machine of claim 3, wherein the hydraulic cooler is further fluidly coupled to the at least one hydraulic pump.

5. The construction machine of claim 1, wherein the at least one hydraulic valve is a shuttle valve.

6. The construction machine of claim 1 further includes an orifice provided in association with the at least one hydraulic valve, the orifice adapted to limit flow of at least the portion of the fluid to the casing of the at least one hydraulic motor.

7. The construction machine of claim 1 further includes a controller communicably coupled to the at least one hydraulic valve and at least one operational parameter sensor associated with at least one of the machine and the at least one hydraulic motor, the controller configured to:
   receive a signal indicative of an operational parameter of at least one of the machine and the at least one hydraulic motor;
   determine exceeding of the operational parameter beyond a threshold; and
   control the at least one hydraulic valve to selectively allow flow of at least the portion of the fluid at low pressure from the low pressure line to the casing of the at least one hydraulic motor based, at least in part, on the determination.

8. The construction machine of claim 1, wherein the operational parameter is at least one of a temperature of the at least one hydraulic motor, a rotational speed of the at least one hydraulic motor, and a ground speed of the machine.

9. A propulsion system for a construction machine, the construction machine having at least a first compaction member, a second compaction member, a third compaction member, and a fourth compaction member associated therewith, the propulsion system comprising:
   a first hydraulic motor adapted to rotate the first compaction member;
   a second hydraulic motor adapted to rotate the second compaction member;
   a third hydraulic motor adapted to rotate the third compaction member;
   a fourth hydraulic motor adapted to rotate the fourth compaction member;
   a first hydraulic pump fluidly coupled to each of the first hydraulic motor and the second hydraulic motor via a first high pressure line and a first low pressure line, the first high pressure line adapted to allow flow of a fluid at high pressure from the first hydraulic pump to each of the first hydraulic motor and the second hydraulic motor, the first low pressure line adapted to allow flow of the fluid at low pressure from each of the first hydraulic motor and the second hydraulic motor to the first hydraulic pump;
   a second hydraulic pump fluidly coupled to each of the third hydraulic motor and the fourth hydraulic motor via a second high pressure line and a second low pressure line, the second high pressure line adapted to allow flow of a fluid at high pressure from the second hydraulic pump to each of the third hydraulic motor and the fourth hydraulic motor, the second low pressure line adapted to allow flow of the fluid at low pressure from each of the third hydraulic motor and the fourth hydraulic motor to the second hydraulic pump; and
   a first hydraulic valve fluidly coupled to the first low pressure line and a casing of each of the first hydraulic motor and the second hydraulic motor;
   a second hydraulic valve fluidly coupled to the second low pressure line and a casing of each of the third hydraulic motor and the fourth hydraulic motor,
   wherein each of the first hydraulic valve and the second hydraulic valve is adapted to selectively allow flow of at least a portion of the fluid at low pressure from each of the first low pressure line and the second low pressure line to the respective casings for cooling of each of the first hydraulic motor, the second hydraulic motor, the third hydraulic motor, and the fourth hydraulic motor respectively.

10. The propulsion system of claim 9, wherein each of the first hydraulic valve and the second hydraulic valve is further fluidly coupled to each of the first high pressure line and the second high pressure line respectively, each of the first high pressure line and the second high pressure line adapted to provide a pilot pressure to each of the first hydraulic valve and the second hydraulic valve respectively.

11. The propulsion system of claim 9, further includes a hydraulic cooler fluidly coupled to the respective casing of each of the first hydraulic motor, the second hydraulic motor, the third hydraulic motor, and the fourth hydraulic motor, the hydraulic cooler adapted to receive flow of at least the portion of the fluid from the respective casings for cooling of at least the portion of the fluid.

12. The propulsion system of claim 11, wherein the hydraulic cooler is further fluidly coupled to each of the first hydraulic pump and the second hydraulic pump.

13. The propulsion system of claim 9, wherein each of the first hydraulic valve and the second hydraulic valve is a shuttle valve.

14. The propulsion system of claim 9 further includes an orifice provided in association with each of the first hydraulic valve and the second hydraulic valve, the orifice adapted to limit flow of at least the portion of the fluid to the respective casing of each of the first hydraulic motor, the second hydraulic motor, the third hydraulic motor, and the fourth hydraulic motor respectively.

15. The propulsion system of claim 9 further includes a controller communicably coupled to each of the first hydraulic valve and the second hydraulic valve, and at least one operational parameter sensor associated with at least one of the machine, the first hydraulic motor, the second hydraulic motor, the third hydraulic motor, and the fourth hydraulic motor, the controller configured to:
   receive a signal indicative of an operational parameter of at least one of the machine, the first hydraulic motor, the second hydraulic motor, the third hydraulic motor, and the fourth hydraulic motor;
   determine exceeding of the operational parameter beyond a threshold; and
   control at least one of the first hydraulic valve and the second hydraulic valve to selectively allow flow of at least the portion of the fluid at low pressure from at least one of the first low pressure line and the second low pressure line to the respective casing of at least one of the first hydraulic motor, the second hydraulic motor, the third hydraulic motor, and the fourth hydraulic motor respectively based, at least in part, on the determination.

16. The propulsion system of claim 9, wherein the operational parameter is at least one of a temperature and a rotational speed of at least one of the first hydraulic motor, the second hydraulic motor, the third hydraulic motor, and the fourth hydraulic motor, and a ground speed of the machine.

17. A method for cooling a propulsion system associated with a construction machine, the method comprising:
   providing flow of a fluid at high pressure from at least one hydraulic pump to at least one hydraulic motor;
   providing flow of the fluid at low pressure from the at least one hydraulic motor to the at least one hydraulic pump;

bleeding, selectively, at least a portion of the fluid at low pressure to a casing of the at least one hydraulic motor; and cooling the at least one hydraulic motor using flow of at least the portion of the fluid at low pressure through the casing of the at least one hydraulic motor.

18. The method of claim 17, wherein bleeding at least the portion of the fluid further includes selectively operating at least one hydraulic valve using flow of the fluid at high pressure to bleed at least the portion of the fluid at low pressure to the casing of the at least one hydraulic motor.

19. The method of claim 18, wherein operating the at least one hydraulic valve further includes controlling the at least one hydraulic valve using a controller based on exceeding of an operational parameter associated with at least one of the machine and the at least one hydraulic motor beyond a threshold.

20. The method of claim 17 further includes:

flowing at least the portion of the fluid from the casing of the at least one hydraulic motor to a hydraulic cooler; and flowing at least the portion of the fluid from the hydraulic cooler to the at least one hydraulic pump.

\* \* \* \* \*